(12) United States Patent
Dinger

(10) Patent No.: US 8,152,685 B2
(45) Date of Patent: Apr. 10, 2012

(54) PLANETARY DRIVE SERVO ACTUATOR

(75) Inventor: Perry L. Dinger, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 454 days.

(21) Appl. No.: 12/371,176

(22) Filed: Feb. 13, 2009

(65) Prior Publication Data

US 2010/0210391 A1 Aug. 19, 2010

(51) Int. Cl.
*F16H 3/44* (2006.01)
*F16H 48/06* (2006.01)

(52) U.S. Cl. .......................... 475/317; 475/149

(58) Field of Classification Search .............. 475/149, 475/150, 156, 157, 154, 325, 326, 327, 317, 475/319, 290, 282, 342, 7, 321, 322; 192/84.92, 192/84.96
See application file for complete search history.

(56) References Cited

U.S. PATENT DOCUMENTS

| | | | | |
|---|---|---|---|---|
| 1,756,907 A | * | 4/1930 | Payne | 192/84.91 |
| 2,962,142 A | * | 11/1960 | Straub | 192/84.2 |
| 3,400,797 A | * | 9/1968 | Horn et al. | 192/90 |
| 3,469,473 A | * | 9/1969 | Zaiser et al. | 475/153 |
| 3,665,278 A | * | 5/1972 | Kazmarek | 318/466 |
| 6,609,992 B2 | * | 8/2003 | Kusumoto et al. | 475/318 |
| 6,616,567 B2 | * | 9/2003 | Strong et al. | 475/331 |
| 6,758,781 B2 | * | 7/2004 | Kusumoto et al. | 475/13 |

OTHER PUBLICATIONS

Garmin GSA81 and GSM85, Sold in the US Prior to Feb. 13, 2008.
Rockwall Collins APS-85 and SVO-85 Product Description, published prior to Feb. 13, 2008.
Sperry SM-200 Servo, Sold in the US prior to Jan. 13, 2008.
Sperry SM-300 Servo, Sold in the US prior to Jan. 13, 2008.

\* cited by examiner

*Primary Examiner* — Sherry Estremsky
*Assistant Examiner* — Lillian Nguyen
(74) *Attorney, Agent, or Firm* — Samuel M. Korte

(57) ABSTRACT

A planetary drive servo actuator comprises a drive assembly operable to turn an output shaft. The drive assembly includes an outer cylinder configured to rotate within the housing and an inner cylinder configured to rotate within the outer cylinder. A clutch is operable to prevent the outer cylinder from rotating within the housing and to allow the inner cylinder to be rotated within the outer cylinder to turn the output shaft.

18 Claims, 9 Drawing Sheets

PLANETARY DRIVE SERVO ACTUATOR

BACKGROUND

Servo actuators are used to provide position control in a wide variety of electro-mechanical systems. For example, servo actuators may be used in guidance systems employed in vehicles such as aircraft, watercraft, agricultural vehicles (e.g. tractors, combines, etc.), and so forth, to adjust the motion of the vehicles without ongoing human intervention. In such systems, one or more servo actuators may be provided to control movement of the vehicle along each axis of motion controlled by the system. The servo actuators drive mechanisms (e.g., control surfaces, rudders, steering linkages, etc.) to change the course of the vehicle along the axis of motion being controlled.

In autopilot systems utilized by aircraft, servo actuators may be furnished to actuate each control surface controlled by the autopilot system (e.g., ailerons, rudder, elevators, trim, and so forth). The servo actuators move the flight control surfaces of the aircraft when the autopilot system is engaged to maintain the aircraft's course and attitude. For example, in typical implementations, the servo actuators may turn a capstan to which one end of a cable is attached. The other end of the cable is then attached to a cable or mechanical linkage that moves a flight control surface of the aircraft. As the capstan is turned, the cable is wound onto or unwound from the capstan to move the control surface.

To mitigate the possibility that a single failure of a component of a servo actuator could prevent the pilot of the aircraft from controlling the flight control surfaces of the aircraft, conventional servo actuators often employ a capstan that includes a slip clutch. The slip clutch allows the capstan to slip upon application of a predetermined torque in the event that the servo actuator had failed and was seized or jammed. In this manner, the pilot can overcome the seized actuator and maintain control of the flight control surface.

SUMMARY

A planetary drive servo actuator is described. In example embodiments, the planetary drive servo actuator comprises a housing containing a drive assembly operable to turn an output shaft. The drive assembly includes an outer cylinder configured to rotate within the housing and an inner cylinder configured to rotate within the outer cylinder. A clutch is operable to prevent the outer cylinder from rotating within the housing and to allow the inner cylinder to be rotated within the outer cylinder to turn the output shaft.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are exemplary and explanatory only and are not necessarily restrictive of the subject matter claimed.

BRIEF DESCRIPTION OF THE DRAWING FIGURES

The detailed description is described with reference to the accompanying figures. The use of the same reference numbers in different instances in the description and the figures may indicate similar or identical items.

Figure 1:
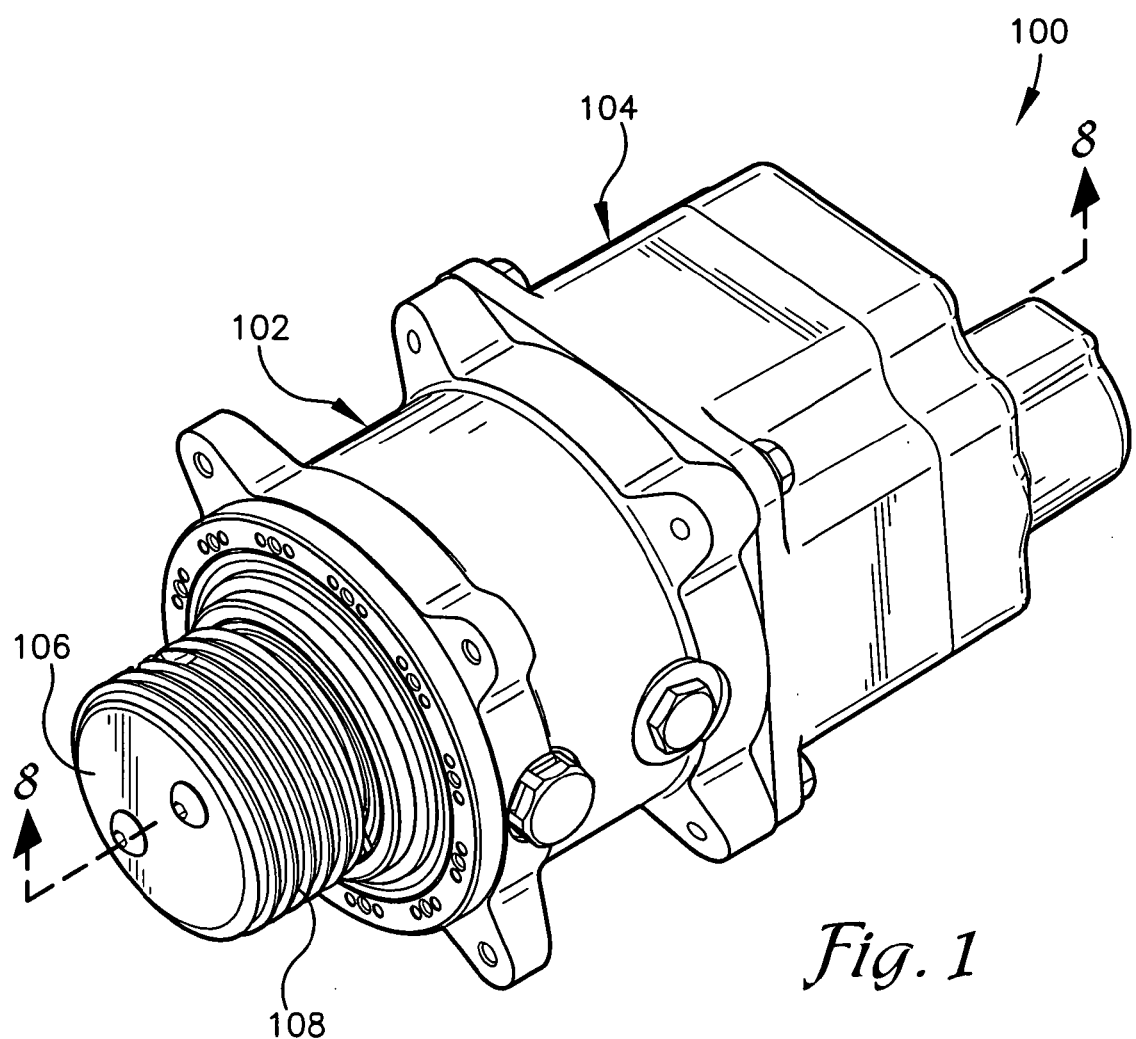
FIG. 1 is an isometric view illustrating an example planetary drive servo actuator.

The drawing figures do not limit the planetary drive servo actuator to the specific embodiments disclosed and described herein. The drawings are not necessarily to scale, emphasis instead being placed upon clearly illustrating elements of the planetary drive servo actuator.

DETAILED DESCRIPTION

Overview

Example embodiments of the planetary drive servo actuator are described in relation to FIGS. 1 through 8. In one embodiment, the planetary drive servo actuator includes a housing containing a drive assembly operable to turn an output shaft. The drive assembly includes an outer cylinder configured to rotate within the housing and an inner cylinder configured to rotate within the outer cylinder. A clutch is coupled to the outer cylinder and is operable to prevent the outer cylinder from rotating within the housing when the clutch is engaged, and to allow the outer cylinder to rotate within the housing when the clutch is disengaged. A motor provides rotational input to the drive assembly through a gear assembly such as a planetary drive gear assembly or a spur gear assembly when the clutch is engaged to rotate the inner cylinder and turn the output shaft.

The planetary drive servo actuator may be actuated to provide a rotational output to the output shaft. When the planetary drive servo actuator is actuated, the clutch is engaged to prevent the outer cylinder of the drive assembly from rotating and to allow the inner cylinder to be rotated within the outer cylinder. The motor may then be powered to rotate the inner cylinder to turn the output shaft. Conversely, when the planetary drive servo actuator is de-actuated, the motor is unpowered. The clutch is disengaged to allow the outer cylinder of the drive assembly to rotate within the housing. In this manner, the output shaft may be turned by an external force without back driving the motor.

In implementations, the planetary drive servo actuator may be configured for use in an autopilot system of an aircraft. For example, the planetary drive servo actuator is configured so that a single failure of a component of the planetary drive servo actuator does not prevent the pilot of the aircraft from controlling the flight control surfaces of the aircraft when the autopilot system is disengaged. Moreover, the planetary drive servo actuator may be configured so that failures of components within the planetary drive servo actuator may be readily detectable to allow the planetary drive servo actuator to be serviced. Consequently, the planetary drive servo actuator may mitigate single point failures and latent failures without employing a capstan that utilizes a slip clutch. Mitigation of single point failures and latent failures is further discussed in relation to FIG. 8. An example autopilot system in which the planetary drive servo actuator may be employed is described in relation to FIG. 9.

Example Embodiments

Figure 2:
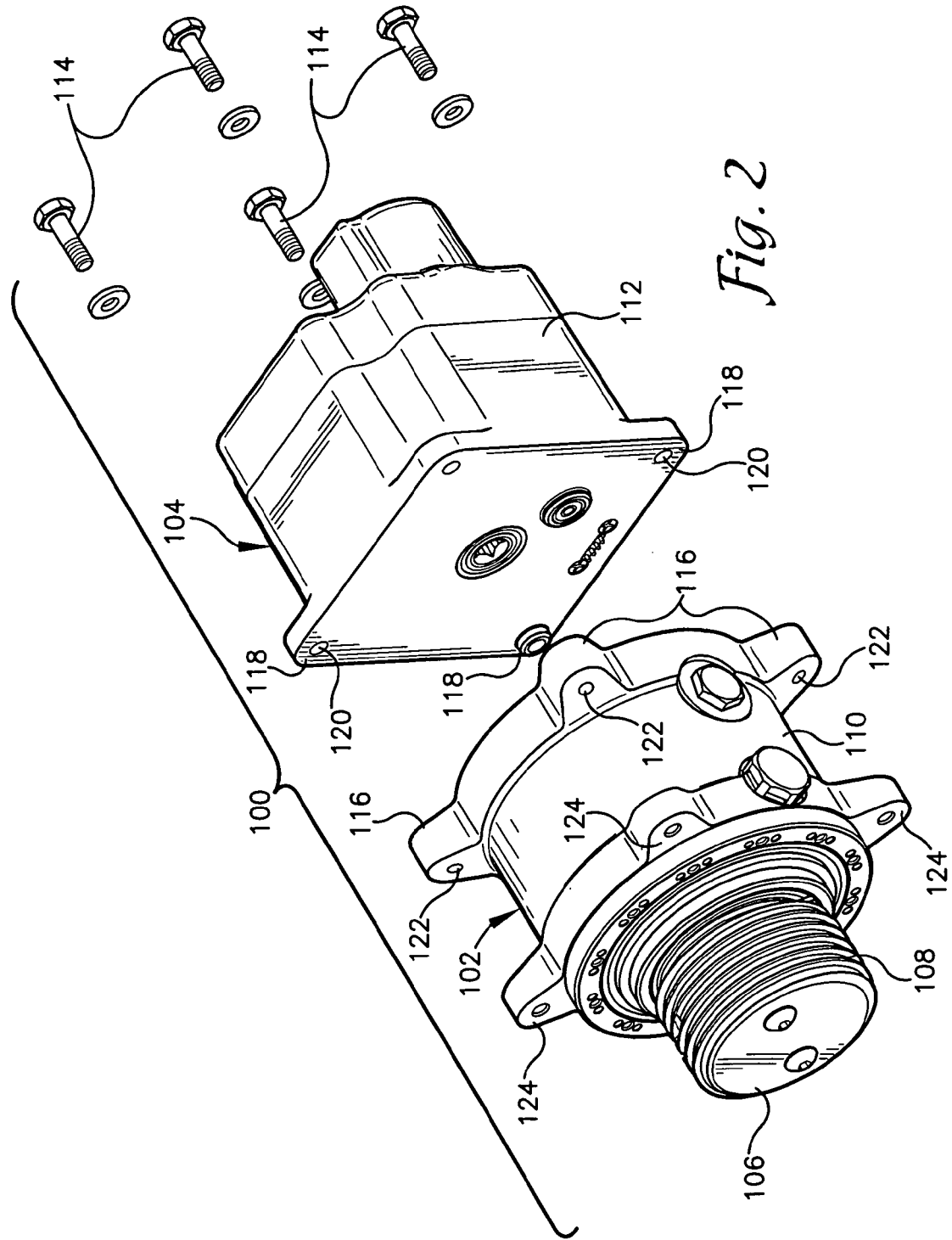
FIG. 2 is an exploded isometric view of the planetary drive servo actuator shown in FIG. 1, further illustrating the planetary drive servo actuator being separated into a servo assembly and a servo actuator assembly.

Referring generally to FIGS. 1 and 2, an example planetary drive servo actuator 100 is described. As shown in FIG. 1, the planetary drive servo actuator 100 is comprised of a servo clutch assembly 102 and a servo actuator assembly 104. When driven by the servo actuator assembly 104, the servo clutch assembly 102 produces a rotational output that may be used to drive a variety of mechanisms. For instance, in the embodiment illustrated, the planetary drive servo actuator 100 may provide a rotational output to turn a capstan 106 to which a cable (not shown) may be attached. As the capstan 106 is turned in a first direction (e.g., counterclockwise), the cable is wound onto the capstan 106. Conversely, as the capstan 106 is turned in the opposite direction (e.g., counterclockwise) the cable is unwound from the capstan 106. The capstan may include a helical groove 108 to guide the cable as it is wound onto or from the capstan 106.

As shown in FIG. 2, the servo clutch assembly 102 and servo actuator assembly 104 may be fabricated as separate, self-contained sub-assemblies. In this manner, either one or both of the servo clutch assembly 102 or the servo actuator assembly 104 may be independently replaced if maintenance is to be performed on components within either sub-assembly.

The servo clutch assembly 102 and servo actuator assembly 104 may be joined together in a number of ways. For instance, in the embodiment illustrated, the housings 110 & 112 of the servo clutch assembly 102 and the servo actuator assembly 104 may be joined together with removable fasteners such as bolts 114. In this embodiment, the servo housing 110 and motor housing 112 may include attachment bosses 116 & 118 that are arranged to mate with one another when the servo housing 110 and the motor housing 112 are joined. The bolts 114 may extend through holes 120 formed in the motor housing attachment bosses 118 and be threaded into threaded holes 122 formed in servo housing attachment bosses 116 to attach the servo actuator assembly 104 to the servo clutch assembly 102. In embodiments, one or more of the attachment bosses 116 & 118 may be keyed (e.g., by a protrusion keyed to fit into a recess, and so forth) to align the servo clutch assembly 102 and servo actuator assembly 104 during assembly. Mounting bosses 124 allow the planetary drive servo actuator 100 to be mounted within the mechanical system in which it operates (e.g., within an aircraft fuselage).

Figure 3:
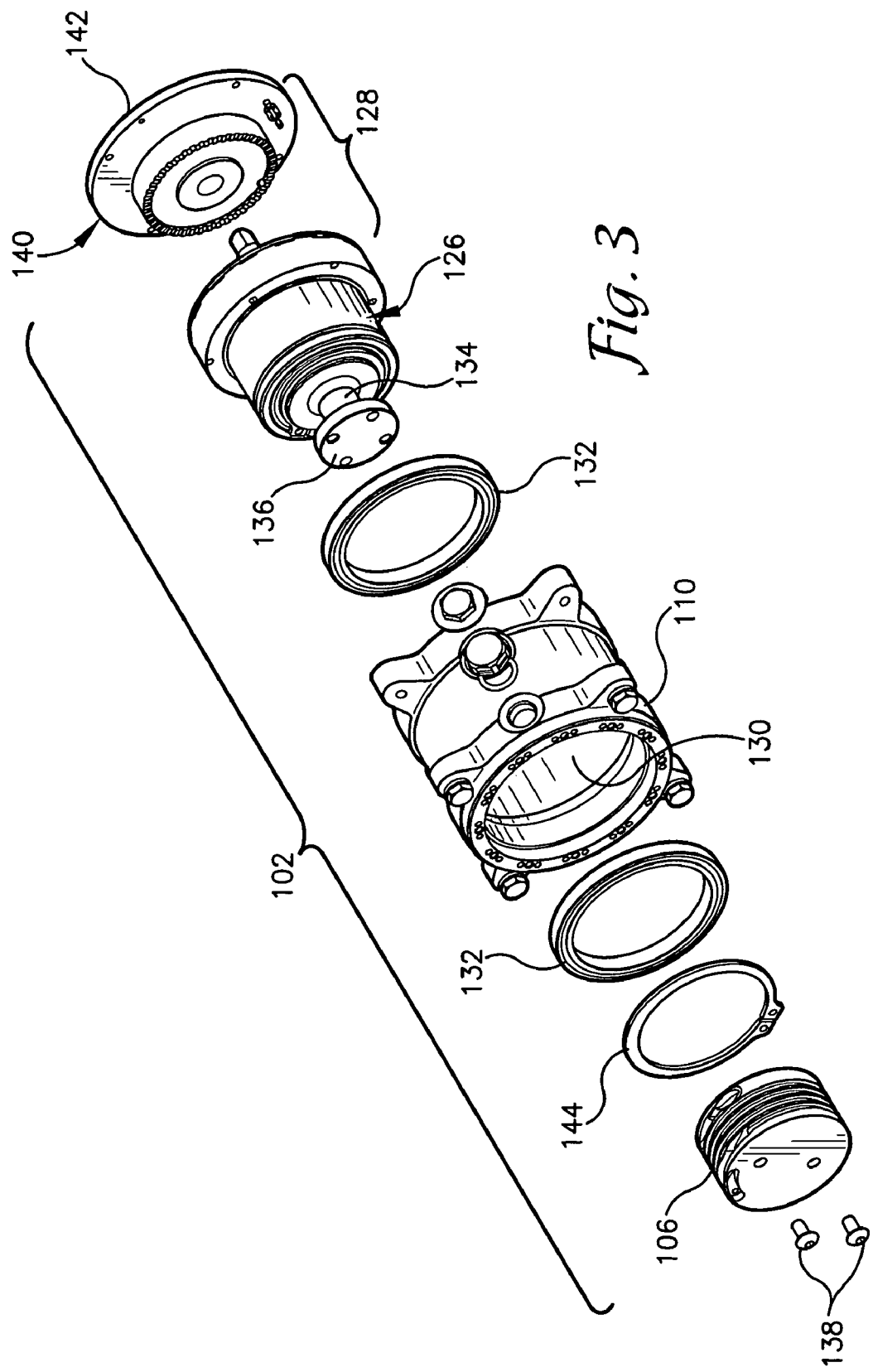
FIG. 3 is an exploded isometric view of the servo clutch assembly shown in FIG. 2, further illustrating the drive assembly and the clutch.

FIGS. 3, 4, 5, and 6 illustrate the servo clutch assembly 102 of FIGS. 1 and 2 in further detail. As shown in FIG. 3, the servo clutch assembly 102 may include the servo housing 110, a drive assembly 126, and an electromagnetic clutch 128. The servo housing 110 may have a generally cylindrical inner bore 130 that is configured to receive the drive assembly 126. Bearings 132 support the drive assembly 126 within the inner bore 130 so that the drive assembly 126 is capable of rotation within the servo housing 110.

The drive assembly 126 is coupled to the servo actuator assembly 104 via a drive shaft and provides a rotational output to turn the capstan 106 when driven by to the servo actuator assembly 104. For example, as shown in FIG. 3, the drive assembly 126 may include an output shaft 134 having a flange 136 to which the capstan 106 may be mounted using fasteners such as screws 138. When driven by the servo actuator assembly 104, the drive assembly 126 rotates the output shaft 134 to turn the capstan 106.

The clutch 128 includes a solenoid assembly 140 that is coupled to the servo housing 110 so that it is fixed with respect to the housing 110. For example, as shown in FIG. 3, the solenoid assembly 140 may include a base plate 142 that is mounted to the servo housing 110 to secure the solenoid assembly 140 to the servo housing 110. The drive assembly 126 and bearings 132 are retained within the bore 130 between the base plate 142 at a first end of the housing 110 and a retaining ring 144 received within the bore 130 at the end of the housing 110 opposite the base plate 142.

The drive assembly 126 may include an outer cylinder configured to rotate within the servo housing 110 and an inner cylinder configured to rotate within the outer cylinder and operable to turn the output shaft 134. In the embodiment illustrated in FIGS. 4 and 5, the outer cylinder of the drive assembly 126 is comprised of a ring gear assembly 146 having a cylindrical sleeve 148 and a ring gear 150, while the inner cylinder comprises a planet carrier assembly 152 including a planet carrier 154 having distal first and second ends. One or more posts 156 may be spaced about the first end of the planet carrier 154 to mount planet gears 158. In the embodiment illustrated, the planet carrier 154 is provided with three posts 156 to mount three planet gears 158. However, it is contemplated the planet carrier 154 may include posts 156 to mount a greater or lesser number of planet gears 158. The output shaft 134 and flange 136 are mounted to the second end of the planet carrier 154.

Figure 4:
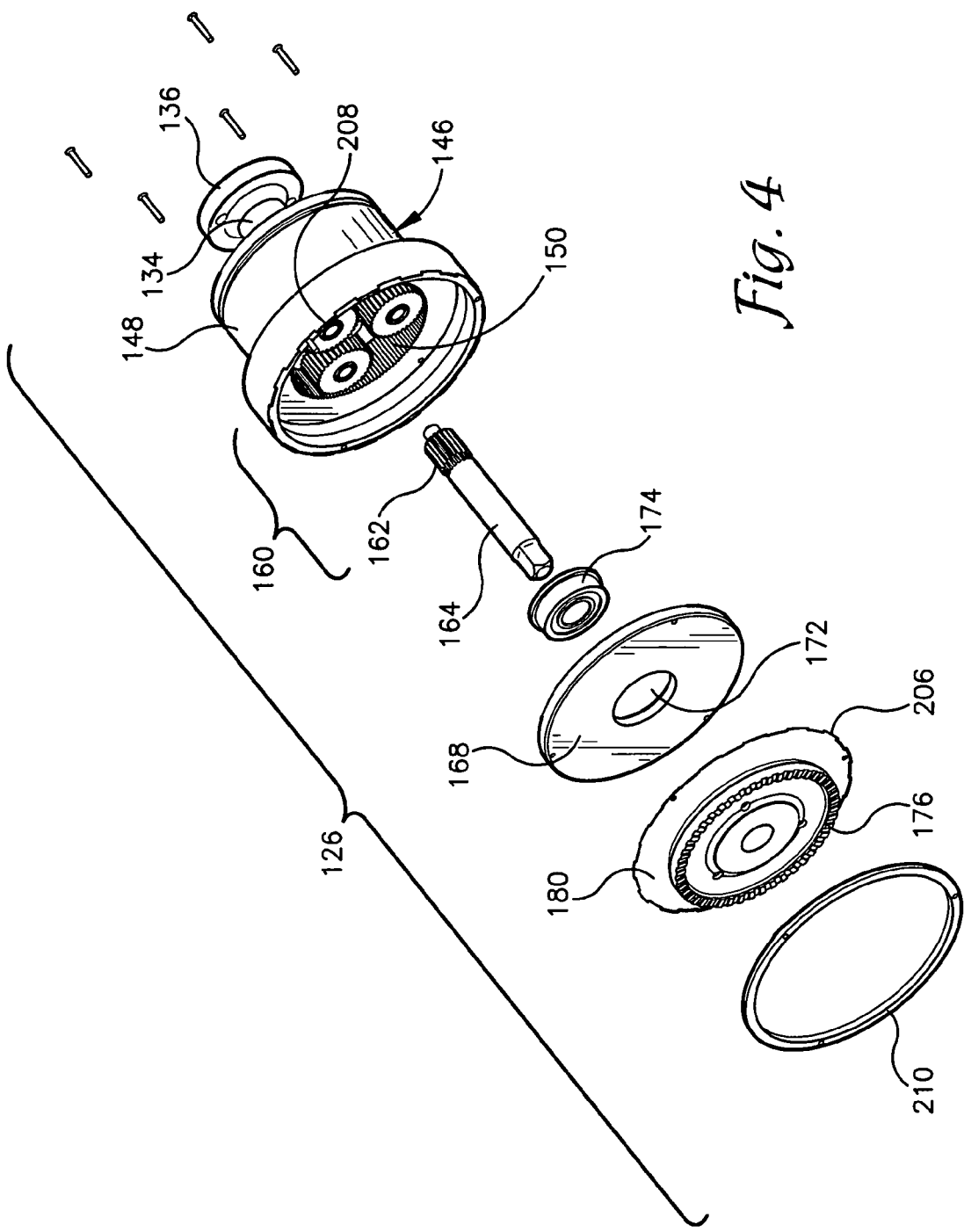
FIG. 4 is a partially exploded isometric view of the drive assembly shown in FIG. 3, further illustrating components of the drive assembly including a planetary drive.

In embodiments, the drive assembly 126 employs a planetary gear assembly 160 that includes the ring gear 150, the planet gears 158 carried by the planet carrier assembly 152, and a sun gear 162. As shown in FIG. 4, the sun gear 162 may include a drive shaft 164 that is driven by a rotational input from the servo actuator assembly 104 (see FIG. 7). The planet gears 158 mesh with the sun gear 162 and the ring gear 150. It is contemplated that the planetary gear assembly 160 may have other configurations. For example, the arrangement of the sun gear 162 and planet gears 158 may be reversed so that the planet gears 158 are coupled to the drive shaft 164 via a suitable planet carrier and the sun gear 162 is mounted to the planet carrier 154. It is further contemplated that the drive assembly 126 may employ other types of gear arrangements. For instance, in one embodiment, the drive assembly 126 may employ an arrangement of spur gears instead of the planetary gear assembly 160.

Figure 5:
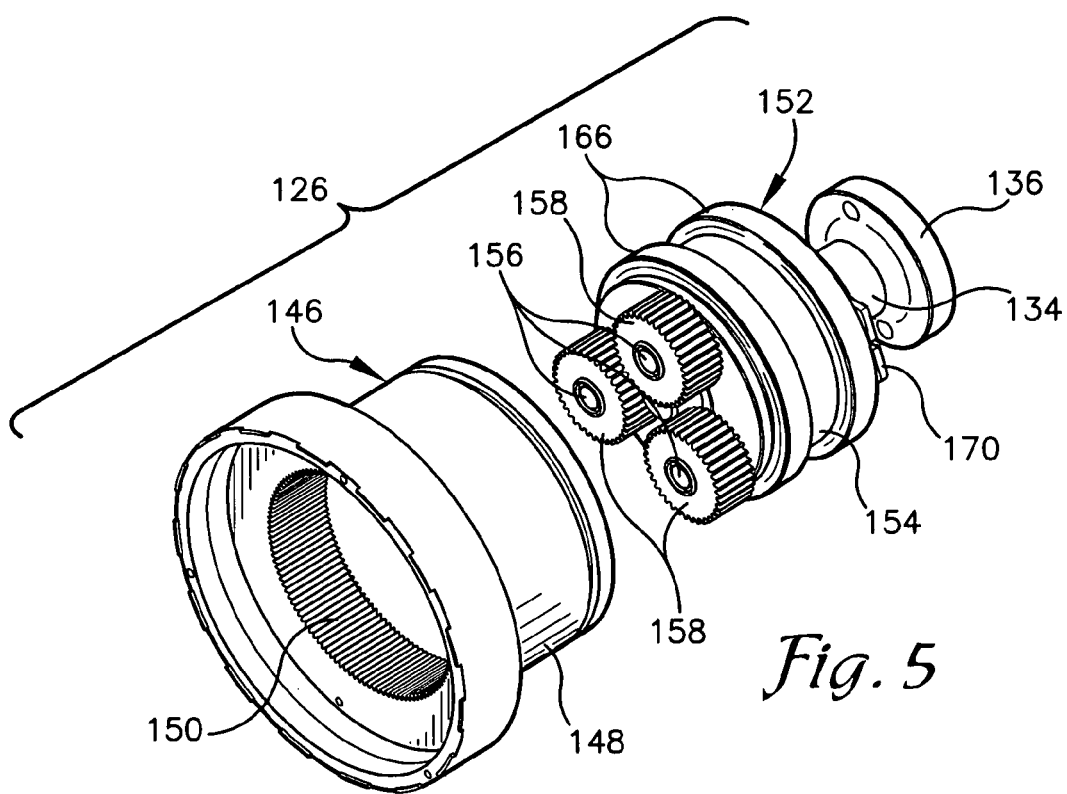
FIG. 5 is an exploded isometric view of the planetary drive assembly shown in FIG. 4, further illustrating components of the planetary drive.

As shown in FIGS. 4 and 5, bearings 166 support the planet carrier 154 of the planet carrier assembly 152 to allow the planet carrier 154 to rotate within the cylindrical sleeve 148. An end plate 168 is mounted to a first end of the drive assembly 126 adjacent to the ring gear 150. The planetary gear assembly 160, planet carrier assembly 152 and bearings 166 are retained within the drive assembly 126 between the end plate 168 and a retaining ring 170 received the cylindrical sleeve 148 opposite the base plate 142. In the embodiment illustrated, the drive shaft 164 extends through a hole 172 formed in the center of the end plate 168. A bearing 174 may be provided in the hole 172 in which the drive shaft 164 may turn.

Figure 6:
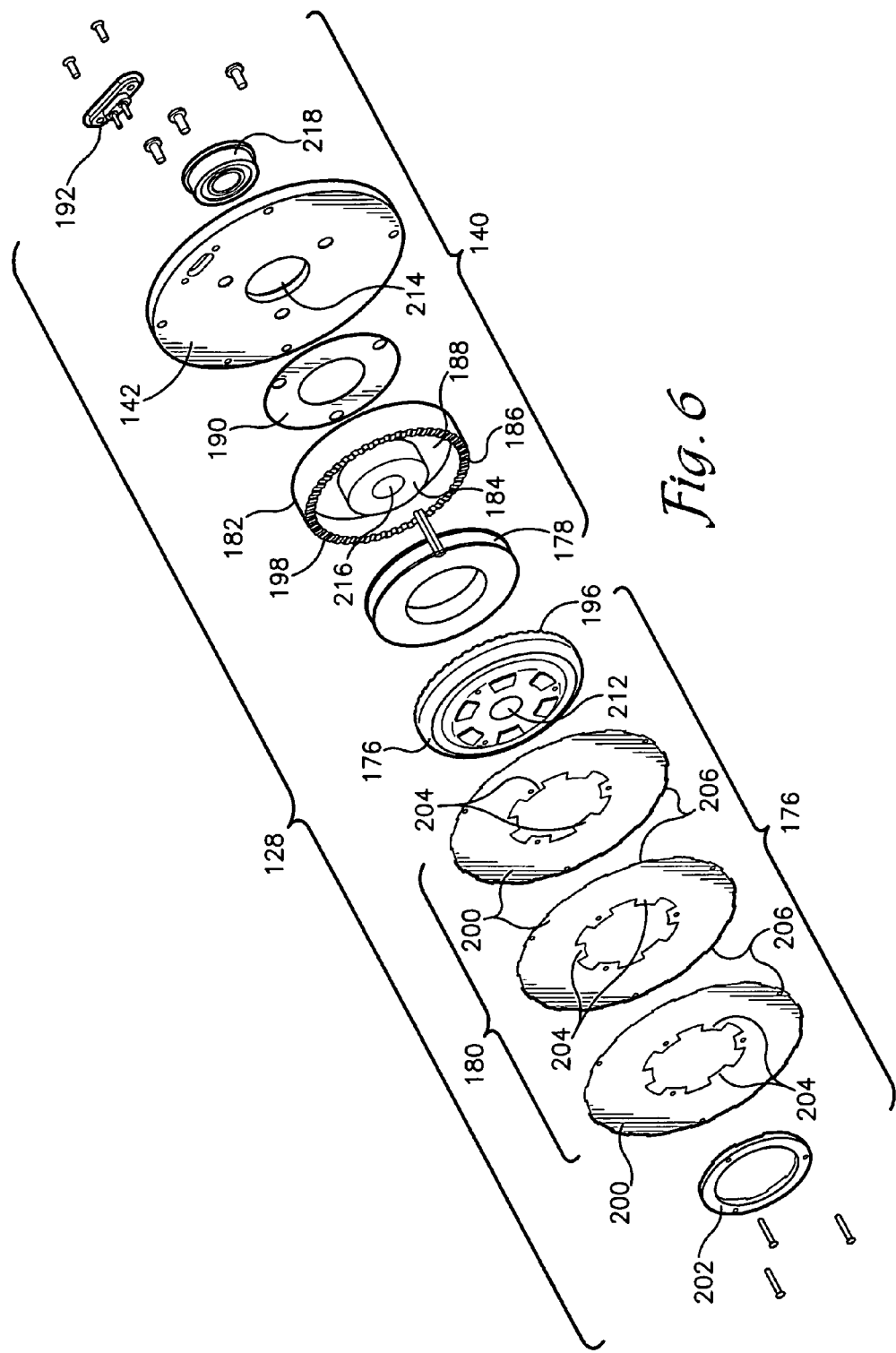
FIG. 6 is an exploded isometric view of the clutch shown in FIG. 3, further illustrating components of the clutch.

As shown in FIG. 6, the clutch 128 includes the solenoid assembly 140 and an armature 176. When the clutch 128 is engaged, a coil 178 is energized by an electrical current to magnetize the solenoid assembly 140 to pull the armature 176 into contact with the solenoid assembly 140. When the clutch 128 is disengaged, the coil 128 is de-energized by removing the electrical current. A spring assembly 180 may then bias the armature 176 away from the solenoid assembly 140.

The solenoid assembly 140 is coupled to the servo housing 110 by the base plate 142 so that the solenoid assembly 140 is fixed with respect to the servo housing 110 (see FIG. 3. In the embodiment illustrated, the solenoid assembly 140 includes a solenoid cup 182 that is coaxially mounted to the base plate 142 to engage the armature 176. The solenoid cup 182 is fabricated of a ferromagnetic material (e.g., iron, steel, and so forth) and includes a central hub 184 and a concentric outer rim 186 that form a ring shaped channel 188 to receive the coil 178. A spacer 190 may be provided between the solenoid cup 182 from the base plate 142 to adjust the distance between the solenoid assembly 140 and the armature 176 when the clutch 126 is disengaged. Electrical power may be provided to the coil 178 via an electrical connector 192 that extends through the base plate 142 and mates with a corresponding connector (solenoid power connector 194) in the servo actuator assembly 104 (see FIG. 7)

The armature 176 is comprised of a disc formed of a ferromagnetic material having a diameter at least approximately equal to the diameter of the concentric outer rim 186 of the solenoid cup 182. In embodiments, the armature 176 includes a plurality of teeth 196 arranged in a ring about its circumference. When the clutch 128 is engaged, the plurality of teeth 196 mesh with a second plurality of clutch teeth 198 arranged in a ring about the outer rim 186 of the solenoid cup 182 to prevent slippage between the solenoid assembly 140 and the armature 176. In other embodiments, the armature 176 and solenoid assembly 140 may include friction surfaces which may engage one another via friction.

As shown in FIG. 4, the armature 176 is coupled to the ring gear assembly by the spring assembly 180, which transmits torque between the armature 176 and the ring gear assembly 146. The spring assembly 180 may be configured in a variety of ways. For instance, in the embodiment shown in FIG. 6, the spring assembly 180 may include one or more disc springs 200 (three disc springs 200 are illustrated) that are sandwiched against an inner surface of the armature 176 by a retainer 202. The disc springs 200 may be formed of a suitable spring material such as beryllium copper, steel, and so forth. In embodiments, each disc spring 200 may have a plurality of inner tabs 204 spaced about its inner circumference and a plurality of outer tabs 206 spaced about its outer circumference. The inner tabs 204 are engaged by the retainer 202 attached to the armature 176 with fasteners (e.g., screws, bolts, welds, etc.) to prevent rotation of the spring assembly 180 with respect to the armature 176. As shown in FIG. 4, the outer tabs 206 engage notches 208 formed in an edge of the ring gear assembly 146 to attach the spring assembly 180 to the ring gear assembly 146. A spring retainer 210 holds the outer tabs 206 within the notches 208 to attach the spring assembly 180 to the ring gear assembly 146.

In embodiments, the drive shaft 164 extends through the clutch 128. For example, as shown in FIG. 6, the armature 176, the base plate 142 and the central hub 184 of the solenoid cup 182 may include holes 212, 214 & 216 through which the drive shaft 164 may extend. A bearing 218 may be provided in the base plate 142 to support the drive shaft 164.

Figure 7:
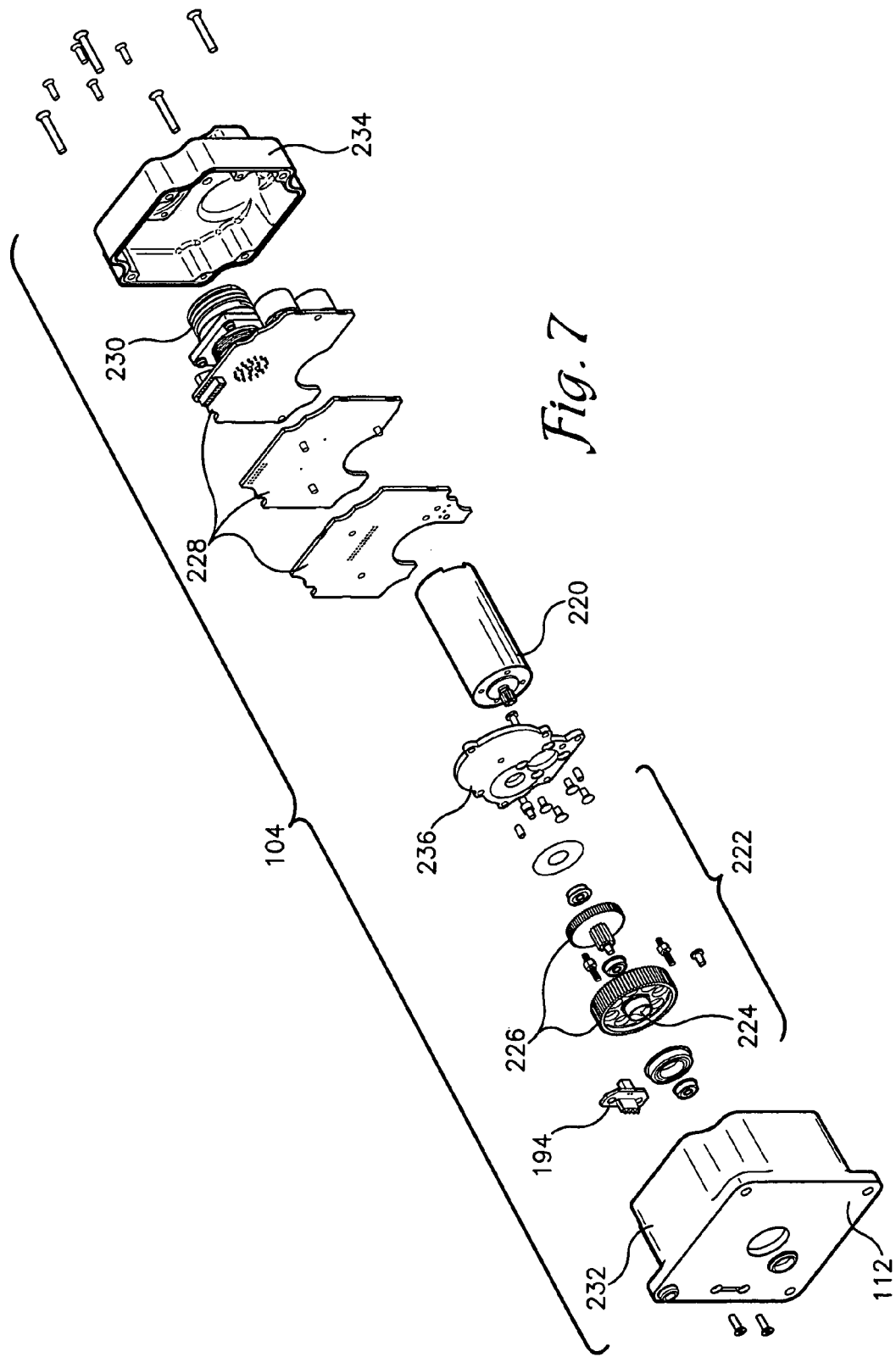
FIG. 7 is an exploded isometric view of the servo actuator assembly of the planetary drive servo actuator shown in FIG. 2, further illustrating components of the servo actuator assembly.

FIG. 7 depicts the servo actuator assembly 104 of FIGS. 1 and 2 in greater detail. As shown in FIG. 7, the servo actuator assembly 104 includes a motor 220 and a transmission 222. When powered, the motor 220 provides torque to drive the transmission 222. The motor 220 may also be back-driven by the transmission 222 when not powered. In one embodiment, the motor 220 may comprise a non-slotted brushless direct current motor and may be non-cogging. However, it is contemplated that the planetary drive servo actuator 100 my employ other types of motors.

The transmission 222 transmits torque from the motor 220 to the drive shaft 164 to provide a rotational input to drive the servo clutch assembly 102 (see FIG. 4). It is contemplated that the drive shaft may be coupled to the transmission in a variety of ways. For instance, in the embodiment illustrated, the transmission 222 includes a socket 224. An end of the drive shaft 164 is received in the socket 224 when the servo clutch assembly 102 and the servo actuator assembly 104 are mated together so that the drive shaft 164 may be turned by the transmission 222 when powered by the motor 220.

The transmission 222 may employ a variety of gear arrangements. In some embodiments, the transmission 222 may produce a mechanical advantage to change the speed of rotation, direction of rotation and/or the torque of the output of the motor 220. For example, in the embodiment illustrated, the transmission 222 may comprise an arrangement of spur gears 226 that are configured to reduce the speed of rotation and an increase in the torque of the output of the motor 220 transmitted to the drive shaft 164 (see FIG. 4).

In example embodiments, the servo actuator assembly 104 may include electronic components that are configured to control the operation of the planetary drive servo actuator 100. For instance, in the embodiment illustrated, the motor housing 112 may house one or more printed circuit boards ("PCB") 228 that contain circuitry to control the operation of the motor 220 and the clutch 128 in response to control signals from an external source. For example, in embodiments wherein the planetary drive servo actuator 100 is utilized in an autopilot system of an aircraft, the circuitry may receive control signals from a flight control computer of the system. A connector 230 couples the servo actuator 100 to the electromechanical system in which it is used to receive control signals and electrical power to drive the motor 220 and clutch 128.

The motor 220, transmission 222 and electronic components including the solenoid power connector 194, the PCB's 228 and the connector 230 are housed within the motor housing 112. In the embodiment illustrated, the motor housing 112 is comprised of a gear housing 232 and a back cover 234 that are coupled together by fasteners such as screws, bolts, and so forth. A mounting plate 236 disposed within the motor housing 112 further supports and aligns the motor 220 and transmission 222 components.

Figure 8:
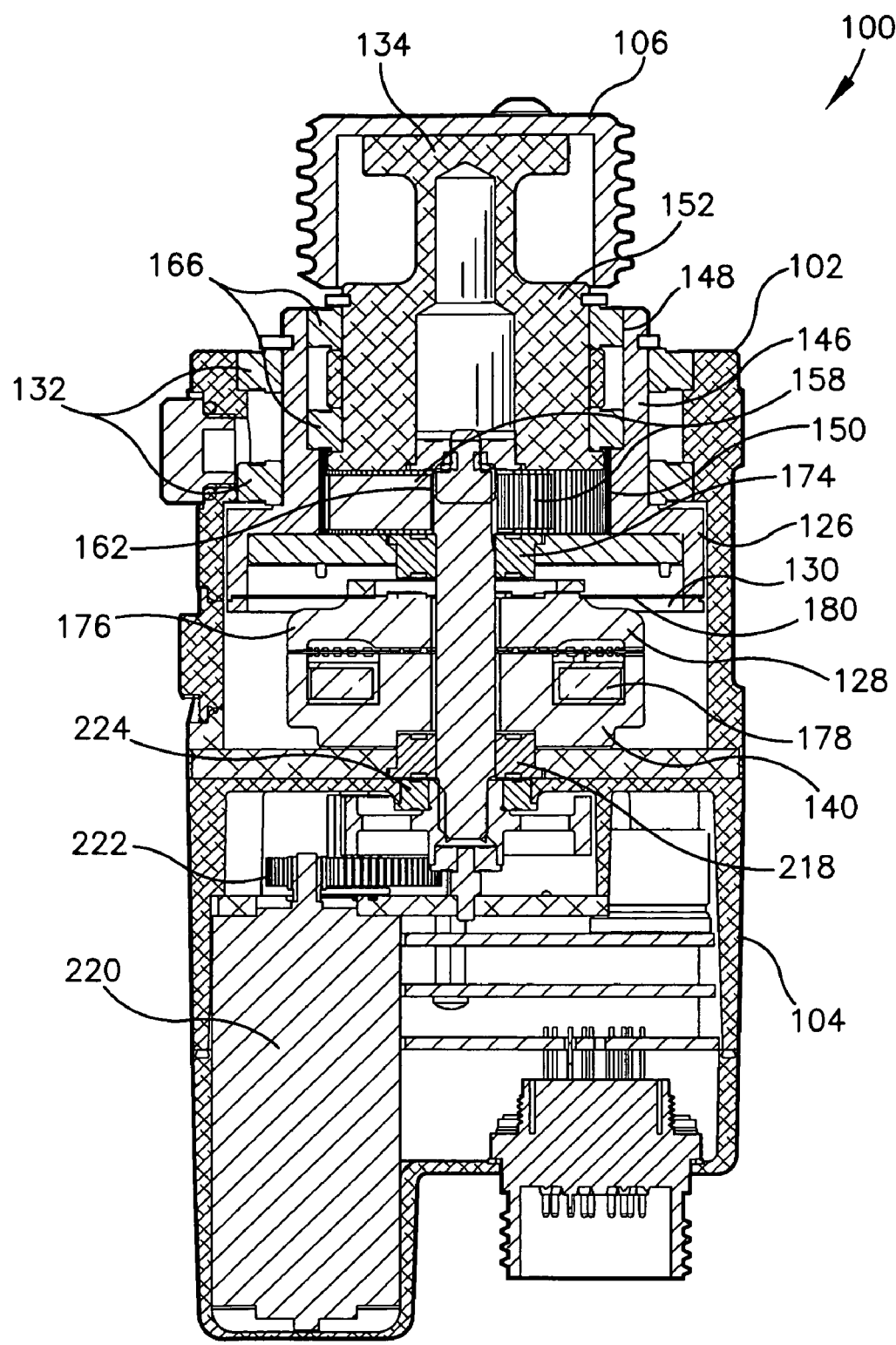
FIG. 8 is cross-sectional side elevation view of the planetary drive servo actuator shown in FIG. 1.

Operation of the example planetary drive servo-actuator 100 shown in FIGS. 1 through 7 will now be described with reference to FIG. 8. The planetary drive servo actuator 100 may be actuated to produce a rotational output by engaging the clutch 128. When engaged, the clutch 128 prevents the drive assembly 126 from rotating within the bore 130 of the servo housing 110 while allowing the planet carrier assembly 152 of the drive assembly 126 to be rotated within the ring gear assembly 146. When the clutch 128 is engaged, the motor 220 may be powered to rotate the planet carrier 154 of the planet carrier assembly 152 and turn the output shaft 134. For instance, in the example embodiment illustrated, the coil 178 of the solenoid assembly 140 may be energized by application of an electric current so that the solenoid assembly 140 is magnetized. The armature 176 is magnetically pulled into contact with the solenoid assembly 140 thereby flexing the spring assembly 180 that couples the armature 176 to the ring gear assembly 146 to engage the solenoid cup 182. As noted, the solenoid assembly 140 is fixed with respect to the servo housing 110. Thus, when the solenoid assembly 140 and armature 176 are engaged, the ring gear assembly 146 is generally held fixed with respect to the servo housing 110 and does not rotate within the servo housing 110.

When the clutch 128 is engaged, the motor 220 is powered. The motor 220 drives the transmission 222 to turn the drive shaft 164 thereby causing the drive shaft 164 and the sun gear 162 to rotate. As the sun gear 162 rotates, the planet gears 158 orbit about the sun gear 162 within the ring gear 150, which is held stationary with respect to the servo housing 110 by the clutch 128. This rotation causes the planet carrier assembly 152 to rotate within the cylindrical sleeve 148 of the ring gear assembly 146 turning the output shaft 134 and capstan 106. It is contemplated that the motor 220 may cause the sun gear 162 to rotate in either of the clockwise or counterclockwise directions to produce either clockwise or counterclockwise rotation of the output shaft 134.

When the planetary drive servo actuator 100 is de-actuated, the motor 220 is unpowered and the clutch 128 is disengaged to allow the drive assembly 126 to rotate within the bore 130 of the servo housing 110. In this manner, the output shaft 134 may be turned by an external force without back driving the motor 220. Instead, turning of the output shaft 134 may cause the planet carrier 154 of the drive assembly 126 to rotate the ring gear assembly 146. For instance, in the example embodiment illustrated, the coil 178 within the solenoid assembly 140 of the clutch 128 may be de-energized by removal of the electrical current so that the solenoid assembly 140 is not magnetized. The armature 176 is then biased away from the solenoid assembly 140 by the spring assembly 180 so that the armature 176 no longer engages the solenoid assembly 140. The ring gear assembly 146 may then rotate within the bore 130 of the servo housing 110. While the clutch 128 is disengaged, the motor 220 is not powered and does not drive the transmission 222 to turn the drive shaft 164. Thus, the sun gear 162 does not rotate substantially and tends to be held fixed with respect to the servo housing 110, for example, by friction within the motor 220 and the transmission 222. If the output shaft 134 is turned, for example, by an external force, the planet gears 158 may rotate about the sun gear 162 within the ring gear 150. Since the sun gear 162 does not rotate substantially, the ring gear 150 is made to rotate causing the drive assembly 126 to rotate within the bore 130 of the servo housing 110.

The planetary drive servo actuator 100 may be employed in a variety of electro-mechanical systems to provide position control for components of the systems. In embodiments, the planetary drive servo actuator 100 may be configured so that a single failure of a component of the actuator 100 does not prevent the output shaft 134 of the planetary drive servo actuator 100 from being turned by an external rotational force applied to the output shaft 134 when the planetary drive servo actuator 100 is de-actuated.

More specifically, as discussed in relation to FIGS. 1 through 8, example planetary drive servo actuators 100 includes a servo clutch assembly 102 that employs a drive assembly 126 comprised of inner and outer cylinders (e.g., planet carrier assembly 152 and ring gear assembly 146) that are supported by inner and outer bearings 166 & 132, respectively. In the event of a failure of a component of the servo clutch assembly 102, this configuration allows an external torque applied to the output shaft 134 to rotate either the outer cylinder (e.g., the ring gear assembly 146) within the servo housing 110 or the inner cylinder (e.g., the planet carrier assembly 152) within the outer cylinder (e.g., the ring gear assembly 146), depending on the specific failure mode. The motor 220 may then be backdriven by the external torque. Similarly, in the event of a failure of a component of the servo actuator assembly 104, the configuration of the servo clutch assembly 102 allows the clutch 128 to be disengaged so that the external torque causes the outer cylinder (e.g., the ring gear assembly 146) to rotate within the servo housing 110, thereby backdriving the ring gear 150, so that the output shaft 134 may be turned.

Accordingly, the planetary drive servo actuator 100 may be utilized in systems where it is desirable to mitigate single point failure. Moreover, operation of the motor 220 may be monitored to detect latent failures of components in the actuator 100 which cause the motor 220 to be backdriven. For example, the planetary drive servo actuator 100 may be used in an autopilot system, where it is desirable to mitigate single point failures that could cause the planetary drive servo actuator 100 to seize, thereby preventing a pilot of the aircraft from overriding the autopilot system and controlling the aircraft's flight control surfaces manually.

Figure 9:
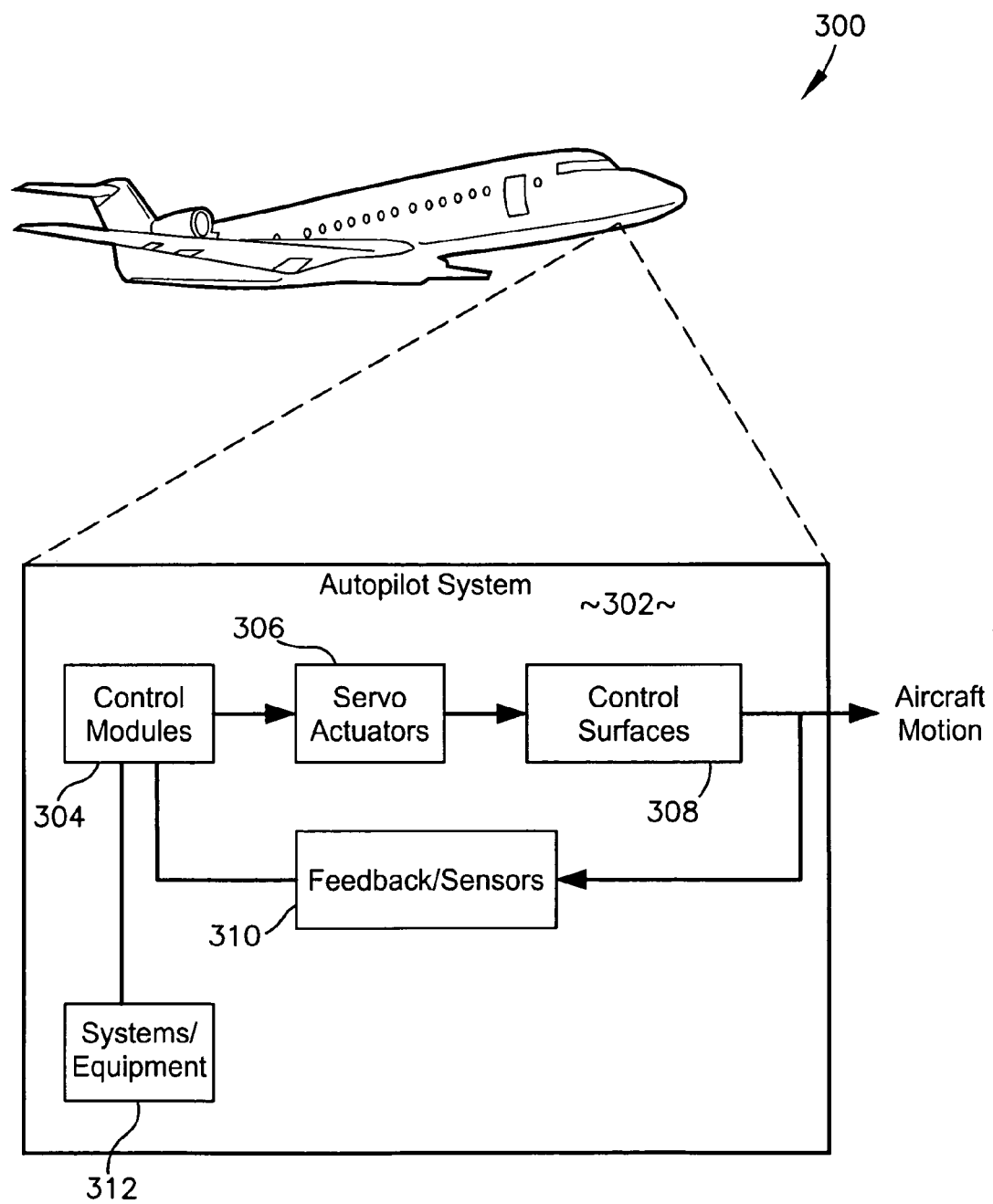
FIG. 9 is a block diagram illustrating an example environment in which the planetary drive servo actuator shown in FIGS. 1 through 8 may be implemented.

FIG. 9 illustrates of an aircraft 300 having an example autopilot system 302 that may employ the planetary drive servo actuator 100 as described in relation to FIGS. 1 through 8. As shown in FIG. 9, the autopilot system 302 may include one or more control modules 304 that control servo actuators 306 for each axis of movement (e.g., yaw, pitch, roll, etc.) controlled by the autopilot system 302. The servo actuators 306 move flight control surfaces 308 (e.g., ailerons, rudder, elevators, etc.) of the aircraft 300 to maintain the aircraft's course and attitude. In embodiments, the control modules 304 may further control servo actuators 306 to move flight control surfaces 308 deployed in particular phases of flight such as takeoff and landing (e.g., flaps, slats, spoilers, air brakes, etc.) or to control the position of flight control surfaces 308 such as trim tabs to trim larger flight control surfaces 308. In implementations, one or more of the servo actuators 306 of the autopilot system 302 may comprise planetary drive servo actuators 100 as described in relation to FIGS. 1 through 8.

The control modules 304 may receive data from sensors 310 that monitor motion of the aircraft 300 and/or the position of the control surfaces 308. The control modules 304 may also receive data from other systems and equipment 312 within the aircraft 300 such as global positioning system (GPS) receivers, accelerometers, altimeters, compasses, airspeed indicators, gyroscopes, navigation systems, and so forth. For instance, in one embodiment, the autopilot system 302 may be implemented as part of an integrated aircraft flight control system (AFCS) that monitors and/or controls the various systems of the aircraft 300. In implementations, the autopilot system 302 may employ two or more redundant, cross-checking control modules 304 to mitigate single point failures within the autopilot system 302.

As shown in FIG. 9, the control modules 304 may monitor data received from the sensors 310 and other systems and equipment 312 of the aircraft 300 and compare the data to a set of control modes. A control mode may include a setting entered by the flight crew of the aircraft 300 that describes one or more aspects of the flight of the aircraft 300. For example, control modes may determine how the aircraft's altitude airspeed, heading and flight path are to be maintained by the autopilot system 302. The control modules 304 determine if the motion of the aircraft 300 conforms to the control modes and send control signals to one or more of the servo actuators 306 to move the aircraft's control surfaces 308 to adjust the aircraft's motion accordingly.

CONCLUSION

Although the planetary drive servo actuator 100 has been described with reference to exemplary embodiments illustrated in the attached drawing figures, it is noted that equivalents may be employed and substitutions made herein without departing from the scope of the invention as recited in the claims. Further, the components of the planetary drive servo actuator 100 as illustrated and described herein are merely examples of components that may be used to implement a planetary drive servo actuator may be replaced with other devices and components without departing from the scope of the present invention.

What is claimed is:

1. A servo actuator comprising:
   a housing;
   a drive assembly operable to turn an output shaft, the drive assembly including an outer cylinder configured to rotate within the housing and an inner cylinder configured to rotate within the outer cylinder; and
   a clutch operable to prevent the outer cylinder from rotating within the housing and to allow the inner cylinder to be rotated within the outer cylinder to turn the output shaft,
   wherein the inner cylinder comprises a planetary carrier assembly having a planet carrier including at least one planet gear,
   wherein the outer cylinder comprises a ring gear assembly having a ring gear,
   wherein the ring gear and the planet carrier are operable to rotate independently of each other when the clutch is disengaged.

2. The servo actuator as recited in claim 1, wherein the clutch is further operable to allow the outer cylinder to rotate within the housing in response to the application of an external torque to the output shaft.

3. The servo actuator as recited in claim 1, further including a planetary gear assembly comprising the ring gear, the planetary carrier assembly, and a sun gear configured to be driven by a rotational input and the planet gear, the planet gear configured to mesh with the sun gear and the ring gear.

4. The servo actuator as recited in claim 3, wherein the clutch is engaged while the sun gear is driven by the rotational input to hold the ring gear stationary with respect to the housing so that the planet gear orbits about the sun gear to rotate the planet carrier.

5. The servo actuator as recited in claim 4, wherein the clutch is disengaged to allow the ring gear to rotate about the sun gear when the output shaft is turned by the external torque to the output shaft.

6. The servo actuator as recited in claim 3, further comprising a motor operable to furnish the rotational input to the sun gear to drive the sun gear.

7. The servo actuator as recited in claim 6, further comprising a transmission operable to transmit the rotational input to the sun gear.

8. The servo actuator as recited in claim 1, further comprising one or more outer bearing assemblies disposed between the housing and the outer cylinder and one or more inner bearing assemblies disposed between the outer cylinder and the inner cylinder.

9. The servo actuator as recited in claim 1, wherein the clutch comprises:
   a solenoid fixedly attached to the housing;
   an armature configured to contact the solenoid when the clutch is engaged;
   a coil configured to magnetize the solenoid to pull the armature into contact with the solenoid; and
   a spring configured to couple the armature to the outer cylinder, the spring operable to bias the armature away from the solenoid.

10. The servo actuator as recited in claim 1, wherein the armature comprises a first plurality of teeth and the solenoid comprises a second plurality of teeth arranged to mesh with the first plurality of teeth.

11. A servo actuator comprising:
    a housing;
    a ring gear assembly configured to rotate within the housing, the ring gear assembly including a cylindrical sleeve and a ring gear;
    a planet carrier assembly configured to rotate within the cylindrical sleeve, the planet carrier assembly including a planet carrier and an output shaft;
    a sun gear configured to be driven by a motor;
    one or more planet gears carried by the planet carrier, the one or more planet gears being configured to mesh with the sun gear and the ring gear; and
    a clutch operable to be engaged to prevent the ring gear assembly from rotating within the housing and to allow the planet carrier assembly to rotate within the cylindrical sleeve when the sun gear is driven by the motor to turn the output shaft,
    wherein the ring gear and the planet carrier are operable to rotate independently of each other when the clutch is disengaged.

12. The servo actuator as recited in claim 11, wherein the clutch is further operable to be disengaged to allow the outer cylinder to rotate within the housing so that turning of the output shaft causes the inner cylinder to rotate the outer cylinder.

13. The servo actuator as recited in claim 12, wherein the clutch is configured to be engaged while the sun gear is driven by the motor to hold the ring gear stationary with respect to the housing so that the planet gears orbit about the sun gear to rotate the planet carrier.

14. The servo actuator as recited in claim 13, wherein the clutch is configured to be disengaged to allow the ring gear to rotate about the sun gear in response to the output shaft being turned.

15. The servo actuator as recited in claim 14, further comprising one or more outer bearing assemblies disposed between the housing and the ring gear assembly and one or more inner bearing assemblies disposed between the cylindrical sleeve and the planet carrier.

16. The servo actuator as recited in claim 11, wherein the clutch comprises:
    a solenoid fixed within the housing;
    an armature configured to contact the solenoid when the clutch is engaged;
    a coil configured to magnetize the solenoid to pull the armature into contact with the solenoid; and
    a spring configured to couple the armature to the ring gear assembly, the spring operable to bias the armature away from the solenoid.

17. The servo actuator as recited in claim 11, further comprising a motor operable to drive the sun gear.

18. The servo actuator as recited in claim 17, further comprising a transmission operable to transmit a rotational input from the motor to the sun gear.

* * * * *